US012701064B2

(12) United States Patent
Cociglio

(10) Patent No.: US 12,701,064 B2
(45) Date of Patent: *Aug. 4, 2026

(54) ONE-WAY DELAY MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 377 days.

This patent is subject to a terminal disclaimer.

(21) Appl. No.: 18/250,784

(22) PCT Filed: Oct. 27, 2021

(86) PCT No.: PCT/EP2021/079782
§ 371 (c)(1),
(2) Date: Apr. 27, 2023

(87) PCT Pub. No.: WO2022/090292
PCT Pub. Date: May 5, 2022

(65) Prior Publication Data
US 2023/0396525 A1      Dec. 7, 2023

(30) Foreign Application Priority Data

Oct. 29, 2020      (IT) ........................ 102020000025699

(51) Int. Cl.
H04L 43/0852 (2022.01)
H04L 43/106 (2022.01)
(Continued)
(52) U.S. Cl.
CPC ........ H04L 43/0858 (2013.01); H04L 43/106 (2013.01); *H04L 43/026* (2013.01); *H04L 43/0864* (2013.01)

(58) Field of Classification Search
CPC . H04L 43/0858; H04L 43/106; H04L 43/026; H04L 43/0864
See application file for complete search history.

(56) References Cited

U.S. PATENT DOCUMENTS 9,787,461 B1      10/2017   Zigelboim et al.
2012/0275333 A1*  11/2012   Cociglio ............. H04L 65/4053
                                                                    370/252
(Continued)

FOREIGN PATENT DOCUMENTS

CN          103155488 A      6/2013
CN          110892680 A      3/2020
(Continued)

OTHER PUBLICATIONS

Riesenberg et al., "Time-Multiplexed Parsing in Marking-based Network Telemetry", ACM SYSTOR, 2019. (Year: 2019).*

(Continued)

*Primary Examiner* — Brian J. Gillis
*Assistant Examiner* — Chhian (Amy) Ling
(74) *Attorney, Agent, or Firm* — Oblon, McClelland, Maier & Neustadt, L.L.P.

(57)          ABSTRACT

A method for performing a one-way delay measurement on a bidirectional packet flow carrying live traffic exchanged between two nodes of a packet-switched communication network. At predefined times, each node transmits to the other node a respective marked packet of the bidirectional packet flow. Each node then transmits unmarked packets of the bidirectional packet flow, until it receives the marked packet transmitted by the other node. In response thereto, each node transmits to the other node another marked packet of the bidirectional packet flow. A measurement point may be placed on the path of the bidirectional packet flow, for detecting the marked packets transmitted in either direction, (Continued)

and for providing a one-way delay measurement based on their detection times.

19 Claims, 3 Drawing Sheets

(51) Int. Cl.
| | |
|---|---|
| *H04L 43/026* | (2022.01) |
| *H04L 43/0864* | (2022.01) |

(56) References Cited

U.S. PATENT DOCUMENTS

| | | | |
|---|---|---|---|
| 2013/0223248 A1* | 8/2013 | Suzuki | H04L 43/0858 370/252 |
| 2014/0160975 A1* | 6/2014 | Cociglio | H04L 43/106 370/252 |

FOREIGN PATENT DOCUMENTS

| | | | | |
|---|---|---|---|---|
| JP | 2016025474 A | * | 2/2016 | H04L 12/70 |
| WO | WO 2011/079857 A1 | | 7/2011 | |
| WO | WO 2019/206862 A1 | | 10/2019 | |

OTHER PUBLICATIONS

Fioccola, et al., "rf8321, Alternate-Marking Method for Passive and Hybrid Performance Monitoring", Internet Engineering Task Force (IETF), 33 Pages, Jan. 2018. (Year: 2018).*

Feng, et al., "Adaptive Packet Marking for Maintaining End-to-End Throughput in a Differentiated-Services Internet", IEEE/ACM Transactions On Networking, vol. 7, No. 5, Oct. 1999, 13 Pages. (Year: 1999).*

Okamoto, JP 2016025474 A, "Delay Measurement Method, Delay Measurement Apparatus, and Program", Feb. 8, 2016, 24 Pages. (Year: 2016).*

International Search Report mailed on Feb. 9, 2022 in PCT/EP2021/079782filed on Oct. 27, 2021, 5 pages).

Mizrahi, et al., "Compact Alternate Marking Methods for Passive and Hybrid Performance Monitoring draft-mizrahi-ippm-compact-alternate-marking-05" txt", Internet-Draft: Network Working Group, Internet Engineering Task F, No. 5 , Jul. 7, 2019 (Jul. 7, 2019), pp. 1-22, XP015133931, Retrieved from the Internet: URL:https://tools.ietf.org/html/draft-mizr ahi-ippm-compact-alternate-marking-05, [retrieved on Jul. 7, 2019], p. 3, line 1—p. 19, last line, (total 22 pages).

Fioccola, et al., "Alternate-Marking Method for Passive and Hybrid Performance Monitoring; RFC 8321.txt", Alternate-Marking Method for Passive and Hybrid Performance Monitoring; RFC8321.TXT, Internet Engineering Task Force, IETF; Standard, Internet Society (ISOC) 4, Rue Des Falaises CH- 1205 Geneva, Switzerland, Jan. 30, 2018 (Jan. 30, 2018), pp. 1-33, XP015125343, p. 3, line 1—p. 27 line 2 (total 33 pages).

Cociglio, et al., "Client-Server Explicit Performance Measurements; draft-cfb-ippm-spinbit-measurements-01", Client-Server Explicit Performance Measurements; Draft-CFB-IPPM-Spinbit-Measurements-02.Txt ; Internet-Draft: IPPM, Internet Engineering Task Force, IETF; Standardworkingdraft, Internet Societ, (ISOC), No. 2 , Jul. 3, 2020 (Jul. 3, 2020), pp. 1-26, XP015140360, Retrieved from the Internet: URL:https://tools.ietf.org/html/draft-cfb-ippm-spinbit-measurements-02 , [retrieved on Jul. 3, 2020], p. 3, line 7—p. 23, last line (total 26 pages).

B. Trammel et al.: Internet draft "The addition of a Spin Bit to the QUIC Transport Protocol draft-trammel-quic-spin-01", Dec. 13, 2017, 22 pages.

Zhang Xiaoyu et al. "An average round of time delay estimation method of specific flow record based on NetFlow", vol. 27, No. 5, May 2010.

Office Action issued Nov. 27, 2025 in Chinese Patent Application No. 202180073542.X, in English.

\* cited by examiner

30 — start transmit Pk (Pk') with
MF = M0                    31

32
t = n x T0       n y transmit Pks (Pks') with
MF = M1                    33 transmit Pk (Pk') with
MF = M0                    34

35
Pks' (Pks) with
MF = M1?       n y transmit Pke (Pke') with
MF = M1                    36

37
end of
measurement?

end

ONE-WAY DELAY MEASUREMENT IN A PACKET-SWITCHED COMMUNICATION NETWORK

TECHNICAL FIELD

The present invention relates to the field of communication networks. In particular, the present invention relates to one-way delay measurements in a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Each packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the processing time of the packet by each node and the propagation time along the links.

WO 2011/079857, in the name of the same Applicant, discloses a method for performing one-way delay measurements on packets carrying live traffic (namely, packets not generated for the purpose of performing the measurement) which uses an alternate marking technique whereby the packet flow to be measured is divided into blocks of packets comprising a marking bit set to a first value (e.g. "1") and blocks of packets comprising a marking bit set to a second value (e.g. "0"). The marking value is periodically switched, so that the blocks of packets marked by the first value are interleaved with the blocks of packets marked by the second value.

Techniques are also known which provide RTT (round-trip time) measurements, instead of one-way delay measurements.

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on a bidirectional packet flow exchanged between two nodes. According to the Internet draft, both the nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has noticed that the above spin bit technique is capable of providing RTT measurements by using a single measurement point placed on the path of the bidirectional packet flow to be measured. However, an RTT measurement disadvantageously does not provide an indication of the contribution which each one of the two counterpropagating directions provides to the overall RTT. If a measured RTT has a critical value, it is not possible to determine which direction (e.g. upstream or downstream) is e.g. affected by a congestion and therefore mostly contributes to the RTT.

The Applicant has then tackled the problem of providing a method for transmitting a bidirectional packet flow carrying live traffic exchanged between two nodes of a packet-switched communication network, which enables one-way delay measurements by a single measurement point placed on the path of the bidirectional packet flow.

In the following description and in the claims, the expression "enabling a one-way delay measurement" will designate an operation of marking and/or conditioning the packets of the bidirectional packet flow to be measured in such a way that a one-way delay measurement can be made by a measurement point placed on the path of the packet flow, either at an intermediate position of the path or at an endpoint of the path.

According to embodiments of the present invention, the above problem is solved by a method wherein each packet of the bidirectional packet flow carrying live traffic between the two nodes comprises a marking field settable to any of one or more first marking values (also termed herein below "measurement marking value(s)") and one or more second marking values (also termed herein below "idle marking value(s)"). At respective predefined times (which may be a same predefined time for both the nodes), the nodes transmit respective marked packets (also termed herein after "start measurement packets"), namely packets of the bidirectional packet flow having their marking field set equal to a measurement marking value (the measurement marking values may be different for the two nodes). Each node then transmits the respective outgoing packets unmarked, namely with their marking field set equal to an idle value, until it receives the start measurement packet transmitted by the opposite node. In response thereto, each node transmits a further marked packet (also termed herein after "end measurement packet"), namely a further packet of the bidirectional packet flow having its marking field set equal to a measurement marking value.

Since the nodes transmit the respective start measurement packets at the same time and transmit the respective end measurement packets as they receive the start measurement packet from the opposite node, the time lapsing between transmission of the start measurement packet and end measurement packet in a certain direction basically is equal to the end-to-end one-way delay in the opposite direction.

A measurement point placed on the path of the bidirectional packet flow may then detect the packets transmitted in a certain direction, read their marking value and provide an end-to-end one-way delay measurement in the opposite direction, as a difference between detection time of the end measurement packet and detection time of the start measurement packet.

If the measurement point has a local clock synchronized with the local clocks of the two nodes, it may also provide an upstream one-way delay measurement (namely, a one-way delay measurement between the node originating the detected measurement packets and the measurement point) as a difference between detection time of the start measurement packet and predefined period T0.

If the measurement point is capable of detecting the measurement packets transmitted in both directions, end-to-end one-way measurements and upstream one-way delay measurements in the two directions may be provided, and also combined to provide a downstream one-way delay measurement in each direction (namely, a one-way delay measurement between the measurement point and the node terminating the measurement packets transmitted in that direction).

Advantageously, all the above one-way delay measurements are provided by a single measurement point placed on the path of the bidirectional packet flow to be measured. It shall be noticed that the measurement point may be implemented and operated by an entity other than the entity managing the marking of the packets at the nodes of the communication network.

According to a first aspect, the present invention provides a method for transmitting a bidirectional packet flow carrying live traffic exchanged between a first node and a second node of a packet-switched communication network, the method comprising:

a) at respective predefined times, by the first node transmitting to the second node a first marked packet of the bidirectional packet flow and by the second node transmitting to the first node a second marked packet of the bidirectional packet flow; and b) by the first node, transmitting to the second node unmarked packets of the bidirectional packet flow until the second marked packet is received from the second node and, in response thereto, transmitting to the second node a third marked packet of the bidirectional packet flow.

Preferably, the method further comprises:

b') by the second node, transmitting to the first node unmarked packets of the bidirectional packet flow until the first marked packet is received from the first node and, in response thereto, transmitting to the first node a fourth marked packet of the bidirectional packet flow.

Preferably, the method steps are repeated cyclically.

Preferably, the respective predefined times are substantially a same predefined time.

More preferably, the first node and the second node comprise reciprocally synchronized local clocks and step a) is started when the local clocks indicate a time n×T0, n being an integer index and T0 being a predefined period.

Preferably, the predefined period T0 is higher than a maximum round-trip time plus a maximum one-way delay between the first node and the second node.

More preferably, the predefined period T0 is set higher than 3 times a calculated round-trip time between the first node and the second node.

According to a variant, the first marked packet and the third marked packet comprise different marking values.

According to a variant, the method further comprises:

c) by the first node, transmitting to the second node unmarked packets of the bidirectional packet flow until the fourth marked packet is received from the second node and, in response thereto, transmitting to the second node a fifth marked packet of the bidirectional packet flow.

According to a second aspect, the present invention provides a method for performing a one-way delay measurement on a bidirectional packet flow carrying live traffic exchanged between a first node and a second node of a packet-switched communication network, the method comprising the steps of the method set forth above and:

d) by a measurement point placed on a path of the bidirectional packet flow, detecting the first marked packet and the third marked packet, and providing the one-way delay measurement based on a detection time of the first marked packet and/or a detection time of the third marked packet.

Optionally, step d) comprises providing a one-way delay measurement from the second node to the first node as a time lapsing between detection of the first marked packet and detection of the third marked packet.

Alternatively or in addition, the measurement point is synchronized with the first node and step d) comprises providing a one-way delay measurement from the first node to the measurement point as a time lapsing between transmission of the first marked packet and detection of the first marked packet.

Optionally, step d) also comprises providing a round-trip time measurement between the first node and the second node as a time lapsing between detection of the first marked packet and detection of the fifth marked packet.

Alternatively or in addition, step d) comprises providing a one-way delay measurement from the first node to the second node as a time lapsing between detection of the third measurement packet and detection of the fifth measurement packet.

According to a third aspect, the present invention provides a node for a packet-switched communication network, the node being configured to exchange a bidirectional packet flow carrying live traffic with a further node of the packet-switched communication network, the node being configured to:

a) at a predefined time n×T0, transmit to the further node a first marked packet of the bidirectional packet flow; and b) transmit to the further node unmarked packets of the bidirectional packet flow until a second marked packet of the bidirectional packet flow is received from the further node and, in response thereto, transmit to the further node a third marked packet of the bidirectional packet flow.

According to a fourth aspect, the present invention provides a packet-switched communication network comprising a first node and a second node exchanging a bidirectional packet flow, wherein:

a) the first node is configured to, at a first predefined time, transmit to the second node a first marked packet of the bidirectional packet flow and the second node is configured to, at a second predefined time, transmit to the first node a second marked packet of the bidirectional packet flow; and b) the first node is further configured to transmit to the second node unmarked packets of the bidirectional packet flow until the second marked packet is received from the second node and, in response thereto, transmit to the second node a third marked packet of the bidirectional packet flow.

Preferably, the packet-switched communication network further comprises a measurement point placed on a path of the bidirectional packet flow, the measurement point being configured to detect the first marked packet and the third marked packet, and provide a one-way delay measurement based on a detection time of the first marked packet and/or a detection time of the third marked packet.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
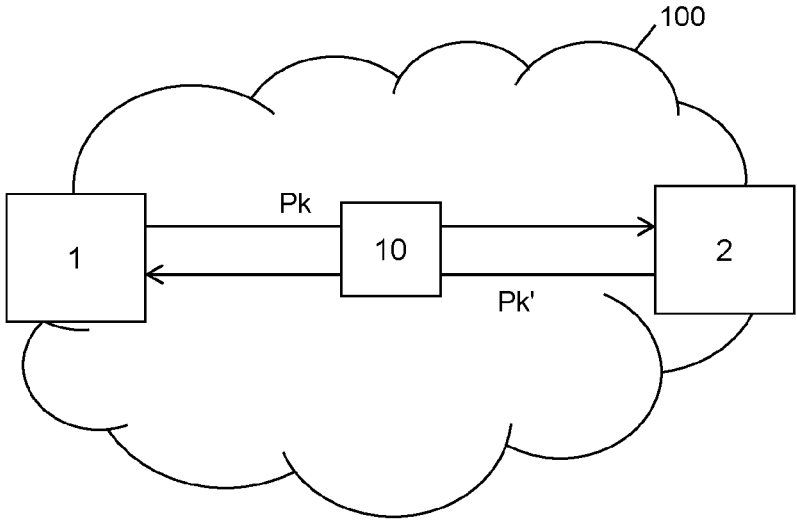
FIG. 1 schematically shows a packet-switched communication network in which the method for performing a one-way delay measurement according to embodiments of the present invention is implemented.

FIG. 1 schematically shows a packet-switched communication network 100 configured to perform a one-way delay measurement according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The nodes 1, 2 are preferably provided with respective local clocks which are reciprocally synchronized. Such local clocks for example may cyclically count from 0 to Tmax. The synchronization error between the local clocks of the nodes 1, 2 is preferably lower than or equal to 1 ms. The synchronization between the local clocks of the nodes 1, 2 may be performed by using a synchronization protocol, such as for instance NTP (Network Time Protocol).

The nodes 1, 2 exchange a bidirectional packet flow including packets Pk transmitted from the node 1 to the node 2 and packets Pk' transmitted from the node 2 to the node 1, as schematically depicted in FIG. 1. The packets Pk, Pk' carry live traffic, namely they are not generated for the purpose of the one-way delay measurement. The packets Pk may belong to a same packet flow (namely, they may all have a same source address and a same destination address, e.g. a same IP source address and a same IP destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
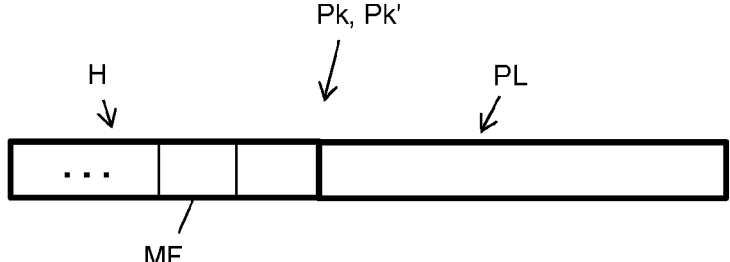
FIG. 2 schematically shows the structure of a packet exchanged in the communication network of FIG. 1, according to embodiments of the present invention.

In particular, as schematically depicted in FIG. 2, each packet Pk, Pk' comprises a payload PL comprising user data and at least one header H. In case of multiple headers, each header pertains to a different network layer. For example, each packet Pk, Pk' may comprise a network layer header (such as an IP header) and transport layer header (such as a QUIC+UDP header or a TCP header). One of the headers H (typically, the network layer header) comprises packet forwarding information, namely information allowing the packets Pk to reach the network node 2 and the packets Pk' to reach the node 1.

Each packet Pk, Pk' also preferably comprises at least one measurement dedicated field MF (also termed herein after "marking field") supporting a one-way delay measurement on the bidirectional packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header. The marking field MF comprises one or more bits, preferably a single bit. The marking field MF may be set to anyone of two alternative marking values, namely an idle marking value M0 (e.g. "0") and measurement marking value M1 (e.g. "1"). By way of non-limiting example, if the packets Pk, Pk' are formatted according to the QUIC protocol, the marking field MF may be the spin bit comprised in the QUIC header as disclosed in the above Internet draft of B. Trammel et al.

Each node 1, 2 appropriately sets the value of the marking field MF in its respective outgoing packets Pk, Pk', before transmitting them, so as to enable a one-way delay measurement.

Figure 3:
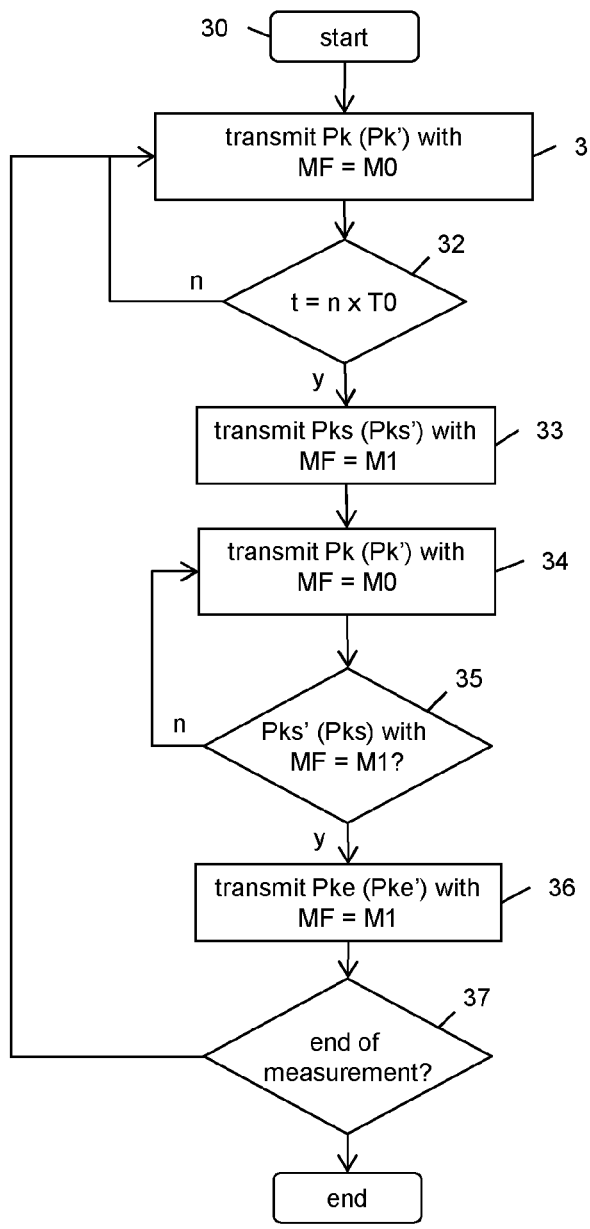
FIG. 3 is a flow chart of the operation of the nodes of the communication network of FIG. 1, according to an embodiment of the present invention.

In particular, with reference to the flow chart of FIG. 3, each node 1, 2 initially sets the marking field MF of its outgoing packets Pk, Pk' to the idle value M0 (step 31).

Each node 1, 2 continues transmitting its outgoing packets Pk, Pk' with their marking field MF set to the idle value M0, until its local clock indicates a respective predefined time (step 32). According to a preferred embodiment, the predefined time is $t=n \times T0$ (n being an integer index equal to 1, 2, . . . ) for both the nodes 1, 2. The period T0 preferably is a submultiple of the maximum time Tmax counted by the local clock of the node 1, 2. For example, if Tmax is equal to 1000 ms, T0 may be equal to 10 ms, 20 ms or 25 ms. If, for example, T0 is equal to 25 ms, the condition at step 32 will be met at $t=25$ ms, $t=50$ ms, $t=75$ ms, . . . and $t=1000$ ms. Further considerations on the choice of T0 will be provided herein below.

When the node 1, 2 determines that $t=n \times T0$, it preferably switches the marking value applicable to its next outgoing packet to be transmitted Pk, Pk' from the previously applied idle value M0 to the measurement value M1, thereby transmitting an outgoing packet Pks, Pks' marked, namely with its marking field MF set to the measurement value M1 (step 33). In the present description and in the claims, such outgoing packet Pks, Pks' is also termed "start measurement packet". It shall be noticed that, since the nodes 1, 2 are provided with reciprocally synchronized clocks, they perform step 33—namely, they transmit their respective start measurement packets Pks, Pks'—substantially at the same time (where "substantially" means short of synchronization errors between their local clocks).

The node 1, 2 then switches again the applicable marking value from the measurement value M1 to the idle value M0, thereby restarting transmitting its outgoing packets Pk, Pk' unmarked, namely with their marking field MF set to the idle value M0 (step 34).

While the node 1, 2 is transmitting its outgoing packets Pk, Pk' to the other node 2, 1, it also receives incoming packets Pk', Pk from the other node 2, 1. The node 1, 2 preferably continuously reads the value of the marking field MF of such incoming packets Pk', Pk.

As long as the node 1, 2 receives incoming packets Pk', Pk with their marking field MF set to the idle value M0, it preferably continues transmitting its outgoing packets Pk, Pk' with their marking field MF set to the idle value M0 (step 34).

When, instead, the node 1, 2 receives the start measurement packet Pks', Pks with its marking field MF set to the measurement value M1 (step 35), it preferably switches again the marking value applicable to its next outgoing packet Pk, Pk' to be transmitted from the idle value M0 to the measurement value M1, thereby transmitting a further outgoing packet Pke, Pke' marked, namely with its marking field MF set to the measurement value M1 (step 36). In the present description and in the claims, such further outgoing packet Pke, Pke' is also termed "end measurement packet".

According to an advantageous variant, the node 1, 2 performs step 36 only if step 33 has been performed. In other words, the node 1, 2 transmits its end measurement packet Pke, Pke' only if the corresponding start measurement packet Pks, Pks' has been transmitted.

The node 1, 2 repeats steps 31-36 cyclically at each time t=n×T0, until the end of the measurement session (step 37).

Hence, at each cycle where both the switching steps 33 and 36 are performed, each node 1, 2 basically transmits to the opposite node 2, 1 two marked packets, namely a start measurement packet Pks, Pks' and a end measurement packet Pke, Pke'. Since both the nodes 1, 2 transmit the respective start measurement packet Pks, Pks' substantially at the same time t=n×T0 (where "substantially" means short of synchronization errors between their local clocks) and transmit the respective end measurement packet Pke, Pke' as they receive the start measurement packet Pks', Pks transmitted by the opposite node 2, 1, the time lapsing between transmission of the start measurement packet Pks, Pks' and end measurement packet Pke, Pke' in a certain direction basically is equal to the end-to-end one-way delay in the opposite direction.

A measurement point 10 placed on the path of the bidirectional packet flow Pk, Pk' as depicted in FIG. 1 may then detect the packets transmitted in a certain direction (e.g. the packets Pk transmitted from the node 1 to the node 2), read their marking value to identify the start measurement packet Pks and end measurement packet Pke and provide for each cycle an end-to-end one-way delay measurement OWD (2→1) in the opposite direction (namely from the node 2 to the node 1), as a difference between detection time of the end measurement packet Pke and detection time of the start measurement packet Pks.

If also the measurement point 10 has a local clock synchronized with the local clocks of the nodes 1, 2, it may also provide for each cycle an upstream one-way delay measurement OWD(1→10) (namely, a one-way delay measurement between the node 1 originating the start and end measurement packets and the measurement point 10) as a difference between detection time of the start measurement packet Pks and start time of the cycle n×T0.

If the measurement point 10 is capable of detecting also marked packets transmitted from the node 2 to the node 1, for each cycle also an end-to-end one-way delay measurement OWD(1→2) from the node 1 to the node 2 and an upstream one-way delay measurement OWD(2→10) may be provided.

All such measurements may be combined to provide a downstream one-way delay measurement in each direction, according to the following equations:

$$OWD(10 \rightarrow 2)=OWD(1 \rightarrow 2)-OWD(1 \rightarrow 10);$$

$$OWD(10 \rightarrow 1)=OWD(2 \rightarrow 1)-OWD(2 \rightarrow 10);$$

Advantageously, all the above one-way delay measurements are provided by a single measurement point 10 placed on the path of the bidirectional packet flow Pk, Pk' to be measured.

According to an embodiment, step 33 is performed only if the next outgoing packet Pk, Pk' to which the measurement marking value M1 shall be applied is transmitted by the node 1, 2 within a predefined time T2 since the start time n×T0 of the current cycle. Alternatively or in addition, step 36 is performed only if the next outgoing packet Pk, Pk' to which the measurement marking value M1 shall be applied is transmitted by the node 1, 2 within a predefined time T2' (equal to or different from T2) since reception of the start measurement packet transmitted by the opposite node 2, 1. T2 and T2' for example may be equal to 1 ms. Since packets Pk, Pk' belong to a real traffic flow and their transmission times are unpredictable, this guarantees that for each cycle a start measurement packet is provided only if its transmission time is not too different from the one assumed by the measurement point 10, and that for each cycle an end measurement packet is provided only if its transmission time is not too different from the reception time of the start measurement packet transmitted from the opposite node. Only accurate one-way measurements are accordingly provided.

Figure 4:
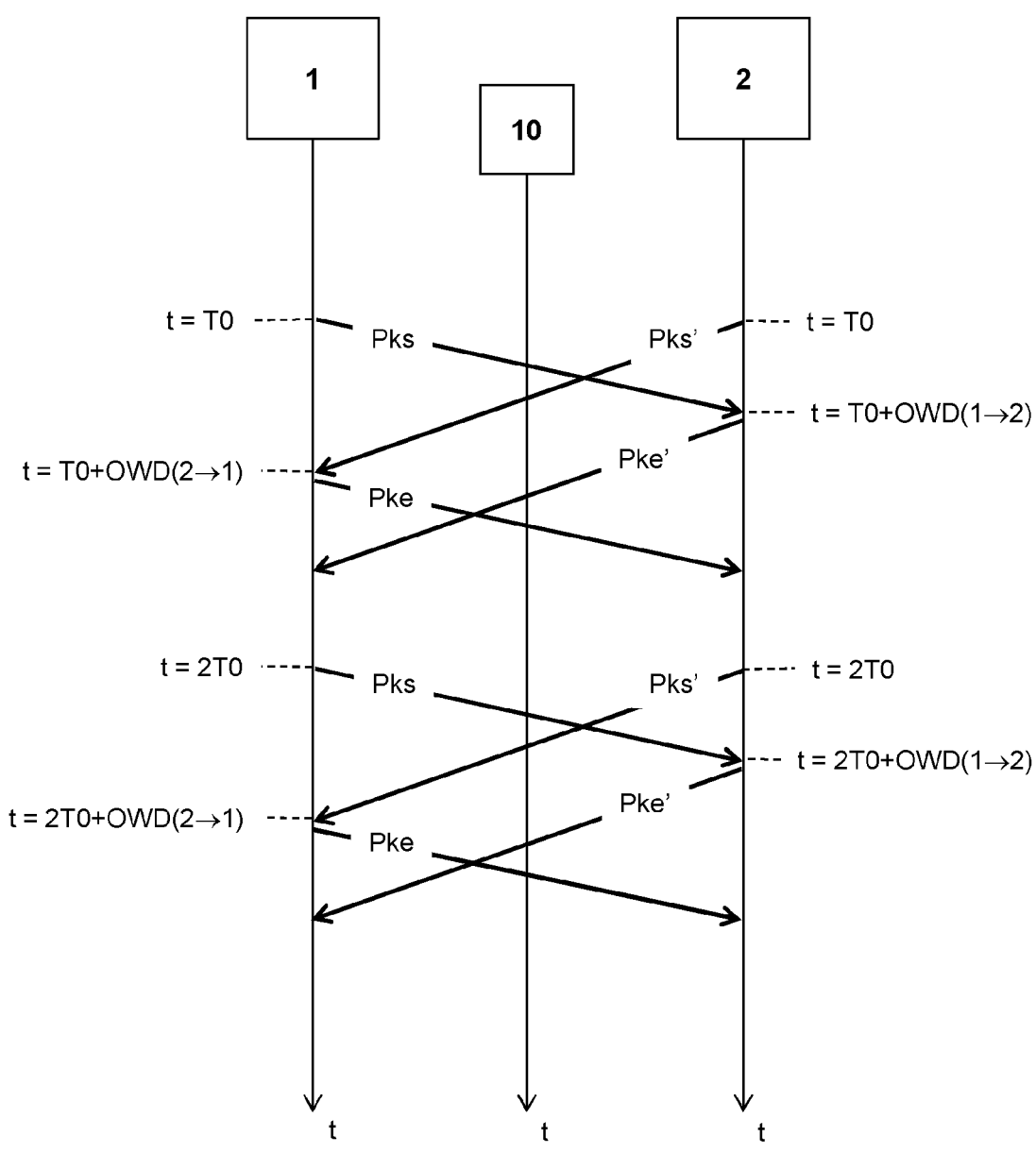
FIG. 4 is a time diagram schematically depicting the operation of the nodes according to the flow charts of FIG. 3.

FIG. 4 is an example of the operation of the nodes 1 and 2 and measurement point 10 according to the flow chart of FIG. 3. In FIG. 4, for simplicity, the only packets of the bidirectional packet flow Pk, Pk' depicted are the start measurement packets and end measurement packets.

Before the measurement is started, both the nodes 1, 2 apply to their outgoing packets the idle marking value M0 (step 31). Substantially at a same time T0 (where "substantially" means short of synchronization errors between their local clocks), both the nodes 1, 2 switch the marking value applicable to the next respective outgoing packet Pk, Pk' to be transmitted from the idle value M0 to the measurement marking value M1, thereby transmitting the respective start measurement packets Pks, Pks' (step 33). Then they switch back the applicable marking value to the idle value M0 (step 34).

Due to the propagation delay from the node 1 to the node 2, the start measurement packet Pks is received at the node 2 at t=T0+OWD(1→2), while due to the propagation delay from the node 2 to the node 1, the start measurement packet Pks' is received at the node 1 at t=T0+OWD(2→1). By way of non limiting example, it is assumed that—due to asymmetry of the connection between the nodes 1 and 2—the one-way delay OWD(1→2) is shorter than the one-way delay OWD(2→1). Hence, the start measurement packet Pks is received at the node 2 before the start measurement packet Pks' is received at the node 1.

At=T0+OWD(1→2), the node 2 receives the start measurement packet Pks (step 35). Hence, the node 2 preferably switches again the marking value applicable to the next outgoing packet Pk' to be transmitted from the idle value M0 to the measurement marking value M1, thereby transmitting the end measurement packet Pke' (step 36). Then the node 2 switches back the applicable marking value to the idle value M0 (step 31).

On the other hand, at t=T0+OWD(2→1), the node 1 receives the start measurement packet Pks' (step 35). Hence, the node 1 preferably switches again the marking value applicable to the next outgoing packet Pk to be transmitted from the idle value M0 to the measurement marking value M1, thereby transmitting the end measurement packet Pke (step 36). Then the node 1 switches back the applicable marking value to the idle value M0 (step 31).

Both the nodes 1 and 2 continue to transmit their respective outgoing packets Pk, Pk' with marking field MF equal to the idle value M0, until a new cycle begins at t=2T0. The operation of the nodes 1, 2 during the second cycle is the same as in the first cycle, hence a detailed description will not be repeated.

The measurement point 10 may then detect the start measurement packets and end measurement packets and provide one-way delay measurements based on them.

In particular, at the first cycle the measurement point 10 may provide an end-to-end one-way delay measurement OWD(2→1) as the time lapsing between detection of the start measurement packet Pks transmitted by the node 1 and detection of the end measurement packet Pke transmitted by the node 1. If the measurement point 10 has a local clock synchronized with the nodes 1, 2, it may also provide an upstream one-way delay measurement OWD(1→10) as the time lapsing between cycle start time T0 and detection of the start measurement packet Pks. The same measurements may be repeated for the second cycle and for any subsequent cycle.

Similarly, at the first cycle the measurement point 10 may provide an end-to-end one-way delay measurement OWD (1→2) as the time lapsing between detection of the start measurement packet Pks' transmitted by the node 2 and detection of the end measurement packet Pke' transmitted by the node 2. If the measurement point 10 has a local clock synchronized with the nodes 1, 2, it may also provide an upstream one-way delay measurement OWD(2→10) as the time lapsing between cycle start time T0 and detection of the start measurement packet Pks'. The same measurements may be repeated for the second cycle and for any subsequent cycle.

Such measurements may also be combined to provide a downstream one-way delay measurement in each direction, according to the equations set forth above.

As described above, the period T0 preferably is a submultiple of the maximum time Tmax counted by the local clocks of the nodes 1, 2.

The period T0 is also preferably chosen so as to maximize the probability that, within each cycle of duration T0, the conditions whereby the nodes 1, 2 decide to perform the switching steps 33 and 36 are met. Moreover, it shall be noticed that if, for example, during a cycle a start measurement packet (e.g. Pks) is lost, the first marked packet Pk (namely, with marking field MF equal to M1) which the node 2 receives during the cycle actually is the end measurement packet Pke. However, a start measurement packet and a end measurement packet are distinguishable from each other by the nodes 1, 2 only based on the order according to which they are received (or detected) within the cycle. Hence, upon reception of the end measurement packet Pke, in response thereto the node 2 erroneously transmits its end measurement packet Pke'. The end measurement packet Pke' is then received at the node 1 at a reception time which is delayed—relative to the cycle start time—by RTT plus the one-way delay from the node 2 to the node 1. In order to avoid measurement errors from that cycle on, it is preferable that such reception time occurs before the next cycle is started.

For this purpose, if a rough estimate of the maximum RTT and maximum one-way delay between the nodes 1 and 2 is known a priori (e.g. based on the length of the connection between the nodes 1 and 2), T0 is preferably set to a value higher than the maximum RTT plus the maximum one-way delay, for example T0=1000 ms.

According to a variant, the period T0 is set to a value higher than 3 times a previously calculated RTT between the nodes 1, 2. For example, the period T0 may be set equal to the minimum (or second minimum) submultiple of Tmax which is higher than 3 times a previously calculated RTT between the nodes 1, 2. According to this variant, the RTT may be calculated before start of a one-way delay measurement session by using any known technique for calculating the RTT.

Once the RTT has been measured, the rule for calculating T0 as a function of the measured RTT shall be the same for both the nodes 1, 2 (and possibly the measurement point 10), so that the period T0 is substantially the same for both the nodes 1, 2 (and possibly the measurement point 10). Then, both the nodes 1, 2 start monitoring their local clocks for initiating the first measurement cycle when their local clocks become equal to n×T0.

It may be appreciated that the nodes 1, 2 may start monitoring their respective local clocks at different times. Hence, during the first cycle, only one node 1, 2 might transmit the respective start measurement packet, while the other node 2,1 might still be completing the initialization or calibration phase preliminary to the monitoring. The node 1, 2 which transmitted the respective start measurement packet would therefore receive no start measurement packet from the other node during the first cycle, and hence it would not transmit its end measurement packet. In this case, for that cycle and in that direction the measurement point 10 will detect a single packet with marking field MF equal to the measurement value M1. In order to obviate this drawback, the node 1, 2 which likely completes the initialization or calibration phase first is preferably configured to wait a predefined time (e.g. RTT/2) before it starts monitoring its own local clock for initiating the first measurement cycle.

However, other mechanisms (such as packet loss affecting the bidirectional packet flow), may cause a loss of the start measurement packet and/or the end measurement packet, at any cycle and in any direction.

If, due to any of the above mechanisms, for a cycle the measurement point 10 detects a single marked packet or no marked packet in a certain direction, it preferably ignores or skips that cycle, so that no one-way delay measurements are provided for that cycle.

Further, as discussed above, if during a cycle a start measurement packet (e.g. Pks) is lost, the first packet Pk with marking field MF equal to M1 which the node 2 receives during the cycle actually is the end measurement packet Pke. However, since the start measurement packet and end measurement packet are distinguishable from each other by the nodes 1, 2 (and by the measurement point 10 too) only based on the order according to which they are received (or detected) within the cycle, upon reception of the end measurement packet Pke the node 2 transmits its end measurement packet Pke'. In this case, the one-way delay measurement based on the detection time of the end measurement packet Pke' is erroneous. Such erroneous measurement may be detected e.g. by a post-processing of the measurement results which may be performed e.g. by a central manager.

Though in the above description it has been assumed that both the nodes 1, 2 use a same measurement marking value M1 and a same idle marking value M0 for marking their respective outgoing packets Pk, Pk', this is not limiting. According to other embodiments, each node 1, 2 may use a respective measurement marking value and/or a respective idle marking value. For example, if the marking field MF is a single-bit field, the node 1 may use "1" as measurement value and "0" as idle value, while the node 2 may use "0" as measurement value and "1" as marking value.

According to an advantageous variant, the marking field MF may comprise at least two bits, thereby providing at least 4 possible marking values including, for example, an idle marking value M0 (e.g. "00") and 3 measurement marking values M1, M2, M3 (e.g. "01", "10" and "11").

According to such advantageous variant, a first measurement marking value M1 may be used for marking the start measurement packets Pks, Pks' at step 33, whereas a second marking value M2 may be used for marking the end measurement packets Pke, Pke'. This advantageously makes the start measurement packets Pks, Pks' and end measurement packets Pke, Pke' reciprocally distinguishable by both the nodes 1, 2 and the measurement point 10. Hence, for example, the node 1, 2 does not risk to erroneously transmit its end measurement packet Pke, Pke' in response to reception of the end measurement packet Pke', Pke from the other node 2, 1, in case the start measurement packet Pks', Pks from the other node 2, 1 has been lost.

Further, the third marking value M3 may be used for additional purposes. For example, when the node 1, 2 receives the end measurement packet Pke', Pke with its marking field MF set to the second measurement value M2 from the other node 2, 1, according to this variant it preferably switches again the marking value applicable to its next outgoing packet Pk, Pk' to be transmitted from the idle value M0 to the third measurement value M3, thereby transmitting an outgoing packet $Pk_{RT}$, $Pk_{RT}'$ with its marking field MF set to the third measurement value M3. Such further outgoing packet $Pk_{RT}$, $Pk_{RT}'$ is also termed "round trip measurement packet".

The measurement point 10 may use the round trip measurement packets $Pk_{RT}$, $Pk_{RT}'$ to provide the following additional measurements:

an RTT measurement as the time lapsing between detection of the start measurement packet Pks, Pks' and detection of the round trip measurement packet $Pk_{RT}$, $Pk_{RT}'$ transmitted in a same direction during a same cycle; and/or an end-to-end one-way delay measurement in the same direction as that of the detected packets, as the time lapsing between detection time of the end measurement packet Pke, Pke' and detection time of the round trip measurement packet $Pk_{RT}$, $Pk_{RT}'$ transmitted in a same direction during a same cycle.

Though, according to such variant, the start measurement packet and end measurement packet are reciprocally distinguishable (and hence the node 1, 2 does not risk to erroneously transmit the respective end measurement packet in response to reception of the end measurement packet from the other node 2, 1), it is anyway preferable that the round-trip measurement packet $Pk_{RT}$, $Pk_{RT}'$ transmitted during a certain cycle is received before the next cycle begins. For this reason, also according to this variant, T0 is preferably higher than the maximum RTT plus the maximum one-way delay between the nodes 1, 2, or at least higher than 3 times an RTT between the nodes 1, 2 which has been previously measured according to any known technique for measuring the RTT.

The invention claimed is:

1. A method for transmitting a bidirectional packet flow carrying live traffic exchanged between a first node and a second node of a packet-switched communication network, said method comprising:
   a) at respective predefined time intervals, by said first node, transmitting to said second node a first marked packet of said bidirectional packet flow, and by said second node, transmitting to said first node a second marked packet of said bidirectional packet flow; and
   b) during the predefined time intervals, by said first node, transmitting to said second node unmarked packets of said bidirectional packet flow until said second marked packet is received by said first node from said second node and, in response to receiving the second marked packet, transmitting to said second node a third marked packet of said bidirectional packet flow, wherein
   a) and b) are repeated cyclically until end of measurement session, and
   the first, second, and third marked packets are different for each cyclic repetition of a) and b).

2. The method according to claim 1, further comprising:
   b') by said second node, transmitting to said first node unmarked packets of said bidirectional packet flow until said first marked packet is received by said second node from said first node and, in response to receiving the first marked packet, transmitting to said first node a fourth marked packet of said bidirectional packet flow.

3. The method according to claim 2, further comprising:
   c) by said first node, transmitting to said second node unmarked packets of said bidirectional packet flow until said fourth marked packet is received by said first node from said second node and, in response to receiving the fourth marked packet, transmitting to said second node a fifth marked packet of said bidirectional packet flow.

4. The method according to claim 2, wherein a), b), and b') are repeated cyclically.

5. The method according to claim 1, wherein said respective predefined time intervals are substantially a same predefined time interval.

6. The method according to claim 5, wherein said first node and said second node comprise reciprocally synchronized local clocks, and wherein a) is started when said local clocks indicate a time n×T0, n being an integer index and T0 being a predefined period.

7. The method according to claim 6, wherein said predefined period T0 is higher than a maximum round-trip time plus a maximum one-way delay between said first node and said second node.

8. The method according to claim 7, wherein said predefined period T0 is set higher than 3 times a calculated round-trip time between said first node and said second node.

9. The method according to claim 1, wherein said first marked packet and said third marked packet comprise different marking values.

10. A method for performing a one-way delay measurement on a bidirectional packet flow carrying live traffic exchanged between a first node and a second node of a packet-switched communication network, said method comprising the method according to claim 1, and:

d) by a measurement point placed on a path of said bidirectional packet flow, detecting said first marked packet and said third marked packet, and providing said one-way delay measurement based on a detection time of said first marked packet and/or a detection time of said third marked packet.

11. The method according to claim 10, wherein d) comprises providing a one-way delay measurement from said second node to said first node as a time lapsing between detection of said first marked packet and detection of said third marked packet.

12. The method according to claim 10, wherein said measurement point is synchronized with said first node, and wherein d) comprises providing a one-way delay measurement from said first node to said measurement point as a time lapsing between transmission of said first marked packet and detection of said first marked packet.

13. The method according to claim 10, wherein d) further comprises providing a round-trip time measurement between said first node and said second node as a time lapsing between detection of said first marked packet and detection of another marked packet.

14. The method according to claim 10, wherein d) further comprises providing a one-way delay measurement from said first node to said second node as a time lapsing between detection of said second marked packet and detection of another marked packet.

15. The method according to claim 1, wherein
said first node and said second node comprise reciprocally synchronized local clocks,
a) is started when said local clocks indicate a time n×T0, n being an integer index and T0 being a predefined period,
said predefined period T0 is higher than a maximum round-trip time plus a maximum one-way delay between said first node and said second node, and
said predefined period T0 is set higher than 3 times a calculated round-trip time between said first node and said second node.

16. The method according to claim 1, further comprising
c) by said first node, transmitting to said second node unmarked packets of said bidirectional packet flow until a fourth marked packet is received by said first node from said second node and, in response to receiving the fourth marked packet, transmitting to said second node a fifth marked packet of said bidirectional packet flow, wherein
a), b), and c) are repeated cyclically.

17. A node for a packet-switched communication network, said node being configured to exchange a bidirectional packet flow carrying live traffic with a further node of said packet-switched communication network, said node comprising:
processing circuitry configured to
a) at a predefined time interval, transmit to said further node a first marked packet of said bidirectional packet flow, and
b) during the predefined time interval, transmit to said further node unmarked packets of said bidirectional packet flow until a second marked packet of said bidirectional packet flow is received by said node from said further node and, in response to receiving the second marked packet, transmit to said further node a third marked packet of said bidirectional packet flow, wherein
the processing circuity is configured to repeat a) and b) cyclically until end of measurement session, and
the first, second, and third marked packets are different for each cyclic repetition of a) and b).

18. A packet-switched communication network comprising:
a first node; and
a second node, the first node and the second node exchanging a bidirectional packet flow carrying live traffic, wherein:
a) said first node is configured to, at a first predefined time during a time period, transmit to said second node a first marked packet of said bidirectional packet flow, and said second node is configured to, at a second predefined time during the time period, transmit to said first node a second marked packet of said bidirectional packet flow; and
b) said first node is further configured to, during the time period, transmit to said second node unmarked packets of said bidirectional packet flow until said second marked packet is received by said first node from said second node and, in response to receiving the second marked packet, transmit to said second node a third marked packet of said bidirectional packet flow, wherein
a) and b) are repeated cyclically until end of measurement session, and
the first, second, and third marked packets are different for each cyclic repetition of a) and b).

19. The packet-switched communication network according to claim 18, further comprising a measurement point placed on a path of said bidirectional packet flow, said measurement point being configured to detect said first marked packet and said third marked packet, and provide a one-way delay measurement based on a detection time of said first marked packet and/or a detection time of said third marked packet.

* * * * *